Figure 1:
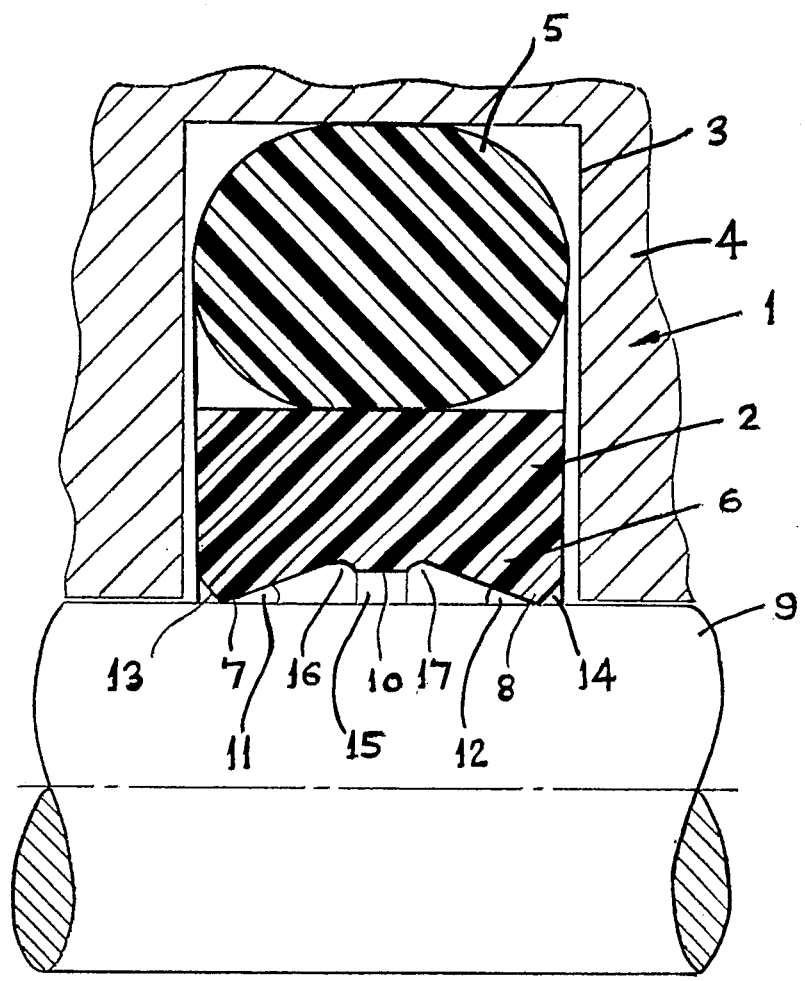

United States Patent [19]

Oseman

[11] Patent Number: 4,702,482
[45] Date of Patent: Oct. 27, 1987

[54] SEALING ASSEMBLY WITH ELASTOMERIC ENERGIZING MEANS

[75] Inventor: Gavin S. Oseman, Malvern, England

[73] Assignee: Dowty Seals Limited, Tewkesbury, England

[21] Appl. No.: 877,406

[22] Filed: Jun. 23, 1986

[30] Foreign Application Priority Data

Jun. 29, 1985 [GB] United Kingdom ............... 8516538

[51] Int. Cl.$^4$ .............................................. F16J 15/32
[52] U.S. Cl. ................................... 277/165; 277/177; 277/206 R
[58] Field of Search ......................... 277/123–125, 277/138, 139, 165, 177, 205, 206 R

[56] References Cited

U.S. PATENT DOCUMENTS

| Re. 28,105 | 8/1974 | Traub | 277/165 |
| 2,893,795 | 7/1959 | Dooling | 277/177 |
| 3,268,235 | 8/1966 | Jacobellis | 277/165 |
| 3,608,913 | 9/1971 | D'Assignies | 277/138 X |
| 3,636,824 | 1/1972 | Clark | 277/165 X |
| 4,335,887 | 6/1982 | Benassi | 277/165 |

Primary Examiner—Robert S. Ward
Attorney, Agent, or Firm—Hayes, Davis & Soloway

[57] ABSTRACT

A sealing assembly, suitable for sealing between two relatively-slidable parts, includes a sealing ring which is housed in an annular groove in one of the parts, which is formed with two circumferential lip portions and which is formed with a circumferential landed portion disposed between those portions. Elastomeric energizing means, also in the grooves and in engagement with the sealing ring, urges the lip portions into fluid sealing engagement with the other of the parts. The landed portion is, under conditions of low fluid pressure upon the assembly, free from fluid sealing engagement with the other part but, under conditions of high fluid pressure upon the assembly, is caused to come into fluid sealing engagement with the other part to supplement the sealing by the lip portions and to share with those portions contact stresses arising on relative movement of the two parts under high applied fluid pressure.

8 Claims, 2 Drawing Figures

SEALING ASSEMBLY WITH ELASTOMERIC ENERGIZING MEANS

This invention relates to sealing assemblies suitable for sealing between two parts relatively-slidable one with respect to the other.

Hitherto certain such sealing assemblies have included a sealing ring, housed in an annular groove provided in one of the two parts and having at least two circumferential lip portions, and elastomeric energising means also housed in the groove and in engagement with the sealing ring for urging the lip portions into sealing engagement with the other of the two parts. However, it has been found in some such assemblies that contact stresses at the interengaging surfaces of the ring and the said other part require to be better distributed if excessive wear of the lip portions and attendant loss in sealing efficiency are to be avoided.

is an object of this invention to provide an improved sealing assembly.

According to this invention a sealing assembly, suitable for sealing between two parts which are relatively-slidable one with respect to the other, includes a sealing ring which is housed in an annular groove provided in one of said parts, which is formed with two axially-spaced-apart, circumferential, lip portions and which is also formed with a circumferential landed portion disposed between said lip portions, and, elastomeric energising means, also disposed in said groove and in engagement with said sealing ring, for urging said lip portions into fluid-sealing engagement with the other of said parts, said circumferential landed portion being, under conditions of low fluid pressure upon said sealing assembly, free from fluid-sealing engagement with said other part and being, under conditions of high fluid pressure upon said sealing assembly, caused to come into fluid-sealing engagement with that other part to supplement the sealing by said lip portions and to share with those lip portions contact stresses arising on relative movement of said parts under the high applied fluid pressure.

The energising means may comprise a ring which in its free state is of circular, or substantially circular, cross-section.

Preferably the depth of said groove and the dimensions of the sealing ring and of the energising ring are such that when those rings are initially fitted to said groove, with said sealing ring in engagement with said other part, and when the assembly is unpressurised by fluid, or is under low fluid pressure, the cross-section of said energising ring is squeezed radially by between 10% and 25% so that its axial dimension is between 85% and 95% of the width of said groove, and the axial dimension of said sealing ring likewise is between 85% and 95% of the width of said groove.

Preferably also the axial width dimension of said landed portion is between 10% and 14% of the axial dimension of said energising ring when so radially squeezed.

Preferably again the angle of said lip portions to the surface of said other part is in the range of 17 degrees to 23 degrees when the sealing ring is in its unstressed condition.

The sealing ring may be of polytetrafluoroethylene or urethane material and the energising ring may be of rubber.

By this invention the sealing assembly maintains optimum contact stress throughout its operating pressure range, thereby reducing seal wear and improving the sealing capability under varying deflection with varying load. Good stability of the sealing assembly is also afforded by virtue of the spaced-apart lip portions.

Figure 2:
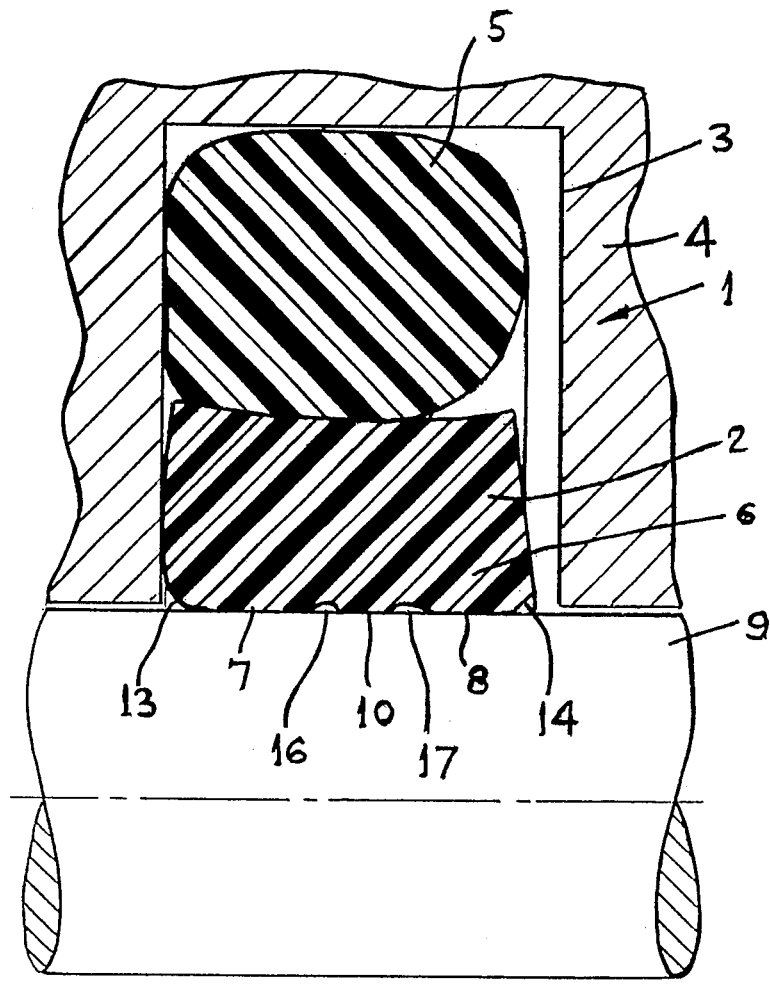

One embodiment of the invention will now be described by way of example with reference to the accompanying drawings, of which:

FIG. 1 is a partial cross-section of a sealing assembly when unpressurised by fluid or under low fluid pressure and thus in an unstressed condition, and FIG. 2 is a partial cross-section of the sealing assembly shown in FIG. 1 when under high fluid pressure from the right and thus in a stressed condition.

In the drawings the sealing assembly 1 comprises a sealing ring 2 of polytetrafluoroethylene material housed in an annular groove 3 in a first part 4 and, surrounding ring 2, an energising ring 5 of rubber also housed in the groove. In its free state ring 5 is of circular cross-section, but upon fitting in the groove and on engagement with ring 2 it is squeezed radially in cross-section by 25% so that its axial dimension is 95% of the width of the groove. The axial dimension of ring 2 is likewise 95% of the width of the groove.

The circumferential radially inner part 6 of ring 2 is formed with two axially-spaced-apart circumferential lip portions 7, 8 which fluid-sealingly engage a cylindrical second part 9 which is relatively-axially-slidable with respect to first part 4. Part 6 is also formed with a circumferential landed portion 10 disposed between the portions 7, 8 as more clearly shown in FIG. 1 in the unstressed condition of ring 2. When this ring is so unstressed the angle of the lip portion to the surface of part 9 is in this embodiment 20 degrees as shown at 11 and 12. Also chamfers are provided at 13 and 14 adjacent the lip portions, the angle of each chamfer being 45 degrees. These chamfers are intended substantially to resist protrusion and early onset of extrusion damage in the sealing ring when subjected to higher pressures. The axial length of landed portion 10 is 12% of the axial width of ring 5 when radially squeezed by 25%.

When the sealing assembly is under low fluid pressure and thus unstressed or substantially so, sealing engagement with part 9 takes place only at the lip portions 7, 8 and landed portion 10 is free from fluid-sealing engagement with part 9, a substantial clearance existing at 15 as shown in FIG. 1 between portion 10 and part 9. Thus engagement of the sealing ring 2 with part 9 is under the preload of the squeezed energising ring 5 and whatever low fluid pressure is applied to the assembly from one side or the other thereof.

When the sealing assembly is under high fluid pressure and thus in a stressed condition, both rings 2 and 5 are so deformed as to reach the shapes shown in FIG. 2. In this condition there is still evidence of the annular recesses 16, 17 flanking landed portion 10, these recesses forming means for retention of lubricant. In this stressed condition of the ring 2, the lip portions 7, 8 are urged with greater pressure against part 9 thus almost to flatten against that part and the landed portion 10 is also urged into positive sealing engagement with part 9 thereby to resist leakage past the assembly under the higher pressure now experienced.

Under such higher pressure and with the landed portion so sealingly engaging part 9, the sealing afforded by the lip portions 7, 8 is supplemented and the contact stresses are more desirably distributed at the interengaging surfaces of ring 2 and part 9.

Although in the embodiment above described with reference to the drawings the energising ring 5 surrounds the sealing ring 2 so that the assembly provides a gland subjectable only on one side to a fluid under pressure, in alternative embodiments of the invention the inverse may instead be the case in that the sealing ring engages a part radially-outwardly thereof and the energising ring is disposed within the sealing ring thus to bear radially-outwardly against the sealing ring. Thus the assembly can form a piston head seal which is subjectable to fluid under pressure on either side thereof in dependence upon the direction of movement of the piston head within its cylinder under double-acting operation.

Further, although in the embodiment above described with reference to the drawings the sealing ring 2 is of polytetrafluoroethylene material, in alternative embodiments of the invention the sealing ring is of urethane material.

In view of the fact that the sealing assembly, above described with reference to the drawings, is in its unpressurised condition of symmetrical form it cannot be incorrectly fitted, that is it can be fitted either way around, in the axial sense, in its groove.

Since the energising ring is preferably of circular cross-section in its free state, that is it is of a standard form, savings in cost of the assembly are achieved.

I claim:

1. A sealing assembly, suitable for sealing between two parts which are relatively-slidable one with respect to the other, including a sealing ring which is housed in an annular groove provided in one of said parts, which is formed with two axially-spaced-apart, circumferential, lip portions and which is also formed with a circumferential landed portion disposed between said lip portions, and, elastomeric energising means, also disposed in said groove and in engagement with said sealing ring, for urging said lip portions into fluid-sealing engagement with the other of said parts, said circumferential landed portion being, under conditions of low fluid pressure upon said sealing assembly, free from fluid-sealing engagement with said other part and being, under conditions of high fluid pressure upon said sealing assembly, caused to come into fluid-sealing engagement with that other part to supplement the sealing by said lip portions and to share with those lip portions contact stresses arising on relative movement of said parts under the high applied fluid pressure.

2. An assembly as claimed in claim 1, wherein said energising means comprises a ring which in its free state is of circular cross-section.

3. An assembly as claimed in claim 1, wherein the depth of said groove and the dimensions of said sealing ring and of the energising ring are such that when those rings are initially fitted to said groove, with said sealing ring in engagement with said other part, and when the assembly is unpressurised by fluid, the cross-section of said energising ring is squeezed radially by between 10% and 25% so that its axial dimension is between 85% and 95% of the width of said groove, and the axial dimension of said sealing ring likewise is between 85% and 95% of the width of said groove.

4. An assembly as claimed in claim 3, wherein the axial width dimension of said landed portion is between 10% and 14% of the axial dimension of said energising ring when so radially squeezed.

5. An assembly as claimed in claim 4, wherein the angle of said lip portions to the surface of said other part is in the range of 17 degrees to 23 degrees when the sealing ring is in its unstressed condition.

6. An assembly as claimed in claim 1, wherein said sealing ring is of polytetrafluoroethylene material.

7. An assembly as claimed in claim 1, wherein said sealing ring is of urethane material.

8. An assembly as claimed in claim 2, wherein said energising ring is of rubber.

* * * * *